Figure 1:
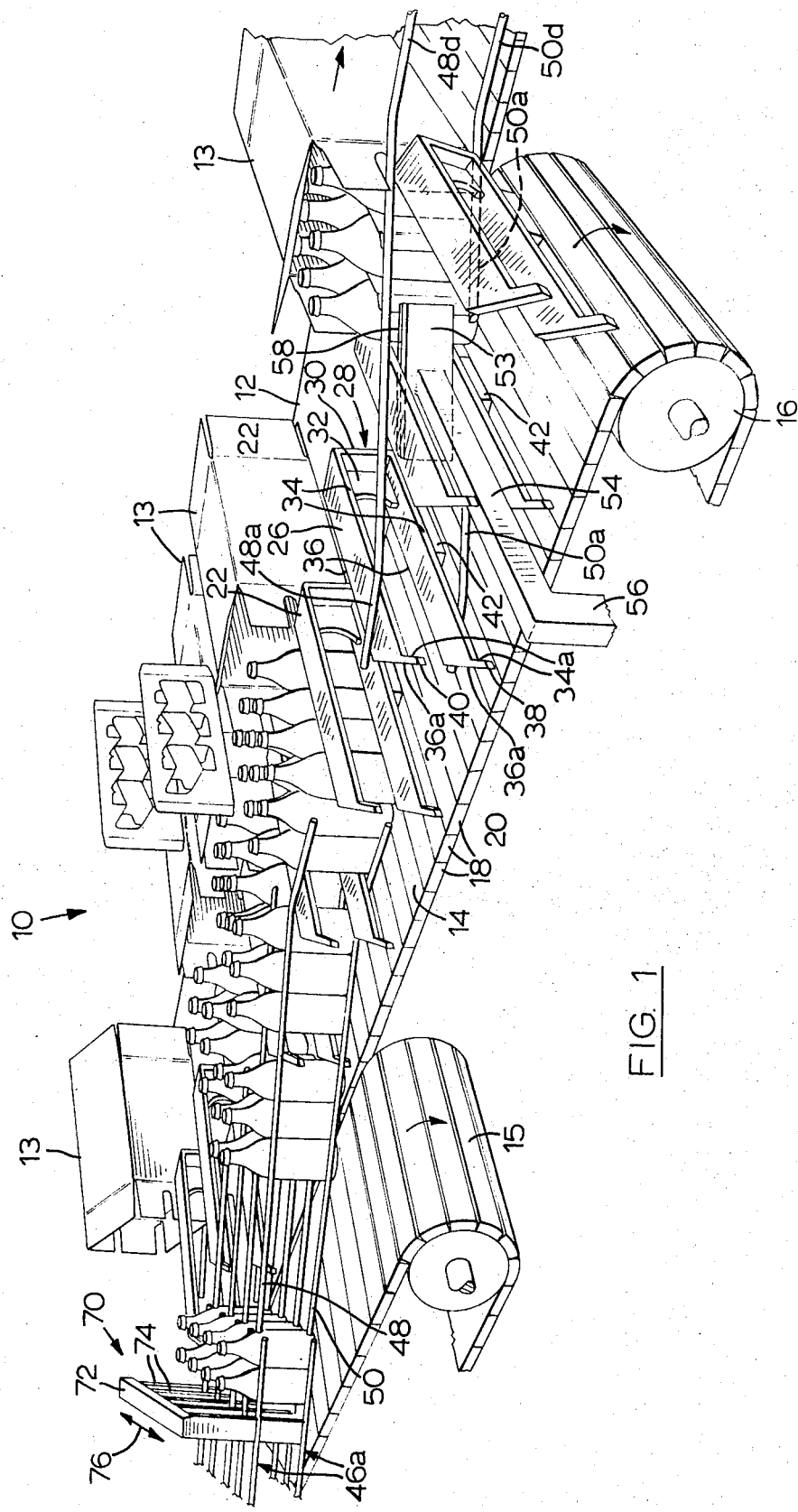

United States Patent [19]

Langen et al.

[11] 3,778,959

[45] Dec. 18, 1973

[54] END LOADERS

[75] Inventors: Marinus J. M. Langen; Jacobus J. Langen, both of Rexdale, Ontario, Canada

[73] Assignee: H. J. Langen & Sons Ltd., Rexdale, Ontario, Canada

[22] Filed: June 21, 1972

[21] Appl. No.: 264,891

[52] U.S. Cl............................ 53/26, 53/147, 53/160, 198/30
[51] Int. Cl........................ B65b 21/06, B65b 35/30
[58] Field of Search........................ 53/26, 147, 148, 53/160; 198/30

[56] References Cited
UNITED STATES PATENTS
2,968,898  1/1961   Hickin .................................... 53/26
3,481,108  12/1969  Englander et al..................... 53/160

FOREIGN PATENTS OR APPLICATIONS
873,855    5/1952   France................................. 53/147

Primary Examiner—Willie G. Abercrombie
Attorney—Gordon W. Hodson et al.

[57] ABSTRACT

In a machine for loading shipper packages such as cartons, trays or the like with containers such as bottles, cans or the like, the improvement of a mechanism for arranging the containers in a series of spaced apart pay-loads while continuously moving the container along a predetermined path. The apparatus includes a conveyor means and a plurality of transversely extending spaced apart fence means mounted on the conveyor. A plurality of container slips, each inclined at an acute angle to the longitudinal direction of the conveyor, are mounted to open onto a marginal edge of the conveyor. Each of the fences has a leading edge which is adapted to engage a container from each of slips in turn as it is driven by the conveyor across the plurality of slips to move the container engaged thereby along its respective slip. The trailing edge of each of the fences is adapted to restrain the movement of the containers through the slips until raked therefrom by the leading edge of the next following fence. The ends of the slips are open at a point spaced inwardly from one edge of the conveyor and the fences pass through the guide rails during their longitudinal movement with the conveyor so as to rake a predetermined number of containers from the discharge end of each slip into each compartment to establish the required pay-load. In addition, the present invention provides an improved mechanism for guiding the containers transversely of the conveyor to discharge into the unloading shipper packages. The improvement consists of a transverse guide rail structure which extends transversely of the conveyor means and is adapted to permit the fences to pass therethrough during their passage along the conveyor means. The transversely extending guide rail means is characterized by a lower guide rail which has a first portion adapted to underlie the lower bar of the fence means and a second portion adapted to overlie the lower bar of the fence means in the area which overlies the fence support pad. The present invention also provides an improved method of discharging containers from a conveyor into an end loading shipper package wherein the conveyors are firstly arranged in at least two rows of containers, one row being staggered with respect to the other row and thereafter moving the containers transversely of the conveyor into the open end of a shipper package and then one row of containers is moved relative to the other so that the containers are moved out of the staggered relationship into a parallel relationship in two planes and thereafter closing the shipper package.

19 Claims, 2 Drawing Figures

END LOADERS

FIELD OF INVENTION

This invention relates to the end loading of shipper packages with containers. In particular this invention relates to improvements in end loading machines for use in loading shipper packages such as cartons or trays with containers such as bottles or cans.

PRIOR ART

In carton loading machinery, bottles and cans are fed to the loader in a continuous stream and it is necessary to separate a group of containers which are to be loaded into one shipper package from the remaining containers of the continuous stream of containers. Conventionally, containers are separated into groups by intermittently interrupting the feed of the stream of containers at a point where the containers are moving along or onto a conveyor. In one known device, a plurality of fingers are adapted to extend upwardly into the path of movement of a stream of conveyors at predetermined intervals. The fingers temporarily interrupt the flow of containers and separate the pay-load from the continuous stream of containers. As a result of the use of this apparatus, the containers which are being directed towards the separating station are repeatedly stopped in their path at spaced intervals of time so that a multitude of collisions occur between the containers in each row of containers. This repeated stopping and starting of the forward movement of the containers and the resulting collisions is particularly undesirable where the containers are glass bottles as it has been found that these collisions cause a considerable number of breakages to occur during the separating operation. Any attempt to speed up the loading of cartons has been found to further increase the number of breakages which occur.

Prior to the present invention, the practice in loading end loading cartons with a plurality of containers such as bottles and the like has been firstly to line up the containers in rows on the first conveyor, transfer the bottles onto a second conveyor and simultaneously segregate them into pay-load groups, and finally transfer the groups onto a third conveyor for transfer therefrom along spaced parallel moving guide rails into the open end of an end loading carton. the mechanism required to achieve this complex separation and loading has been expensive to manufacture and maintain. A typical example of an apparatus of this type is defined in U.S. Pat. No. 3,645,068 issued Feb. 29, 1972.

Difficulty is also experienced in providing a mechanism for moving the prearranged group of bottles transversely of the conveyor to discharge them into the open end of an end loading carton. The common practice has been to provide a complex escalator type mechanism which includes a platform which is movable transversely of a conveyor as the conveyor moves longitudinally, which structure is expensive to manufacture and requires considerable maintenance in order to maintain it in good working order.

Further difficulties have been experienced in attempting to load end loading cartons with a pay-load which is of substantially the same width as the open end of the carton. It is desirable to avoid making the cartons too wide in view of the fact that this would permit the bottles to have a considerable freedom of movement within the container during shipping and resulting in the formation of an unstable load which is difficult to ship. This freedom also permits the bottles to move relative to one another and can result in a considerable number of breakages occurring during shipping. If, however, the carton is made in interference fit with the bottles, considerable difficulty is experienced in attempting to locate the bottles within the carton using the conventional loading methods wherein the bottles are first arranged in the required final configuration and then moved laterally into the open end of a shipper package.

SUMMARY

The present invention overcomes the difficulties of the prior art described above by providing a number of improvements in a machine and method for end loading shipper packages with containers.

According to one embodiment of the present invention, there is provided a simplified apparatus for separating a group of containers from a continuous stream of containers and for loading the separated group of containers into an end loading carton. The improvement of the first embodiment consists of a conveyor means, transversely extending spaced apart fence means on said conveyor means, a plurality of container slips inclined at an acute angle to the longitudinal direction of said conveyor and opening onto said conveyor, the leading side edge of each of said fences being adapted to engage a container in each of said slips in turn as it is driven by said conveyor across said plurality of slips to move said container along its respective slip, the trailing side of each of said fences being adapted to restrain the movement of containers through said slip until raked therefrom by the leading side of the next following fence, each of said slips having a guide means engageable by the side of the containers that inclines in a direction transverse of said container to move the containers raked by said fence transversely of said conveyor and feed means for feeding containers through said slip means.

According to a further embodiment of this invention, there is provided a simplified mechanism for conveying containers laterally into the open end of an end loading shipper package. longitudinal The improvement of this embodiment includes a conveyor means, spaced apart transversely extending fence means on the conveyor means, each of the transversely extending fence means having a lower bar elevated from said conveyor, fence support means mounted on said conveyor and connecting said lower bar of said fence means to said conveyor, container guide means having a first guide rail overlying said conveyor and underlying said lower bar of said fence for a portion of its extent and overlying said lower bar of said fence for a predetermined portion of its extent, said container guide means extending substantially across said conveyor at an incline to the longitudinal axis of said conveyor to guide containers laterally of said conveyor, said first guide rail overlying said lower bar of said fence as aforesaid over the path of said fence support means during movement of said conveyor.

According to a still further embodiment of the present invention, there is provided an improved method for loading containers such as bottles and cans or the like into an end loading shipper package such as a carton, tray or the like comprising the steps of arranging the containers in at least two parallel transversely extending rows of containers, the containers in one row being staggered with respect to the containers in the other row so that the width of the group of containers is less than the multiple of the diameter of the containers and the number of rows of containers and transversely moving said group of containers relative to said conveyor into the open end of a shipper package when in said staggered relationship and thereafter removing said rows of containers relative to one another out of said staggered relationship into a parallel side by side relationship when said containers are located within said cartons so as to increase the width of said group of containers to a multiple of the diameter of the containers and the total number of the containers in the width of the group of containers.

Figure 2:
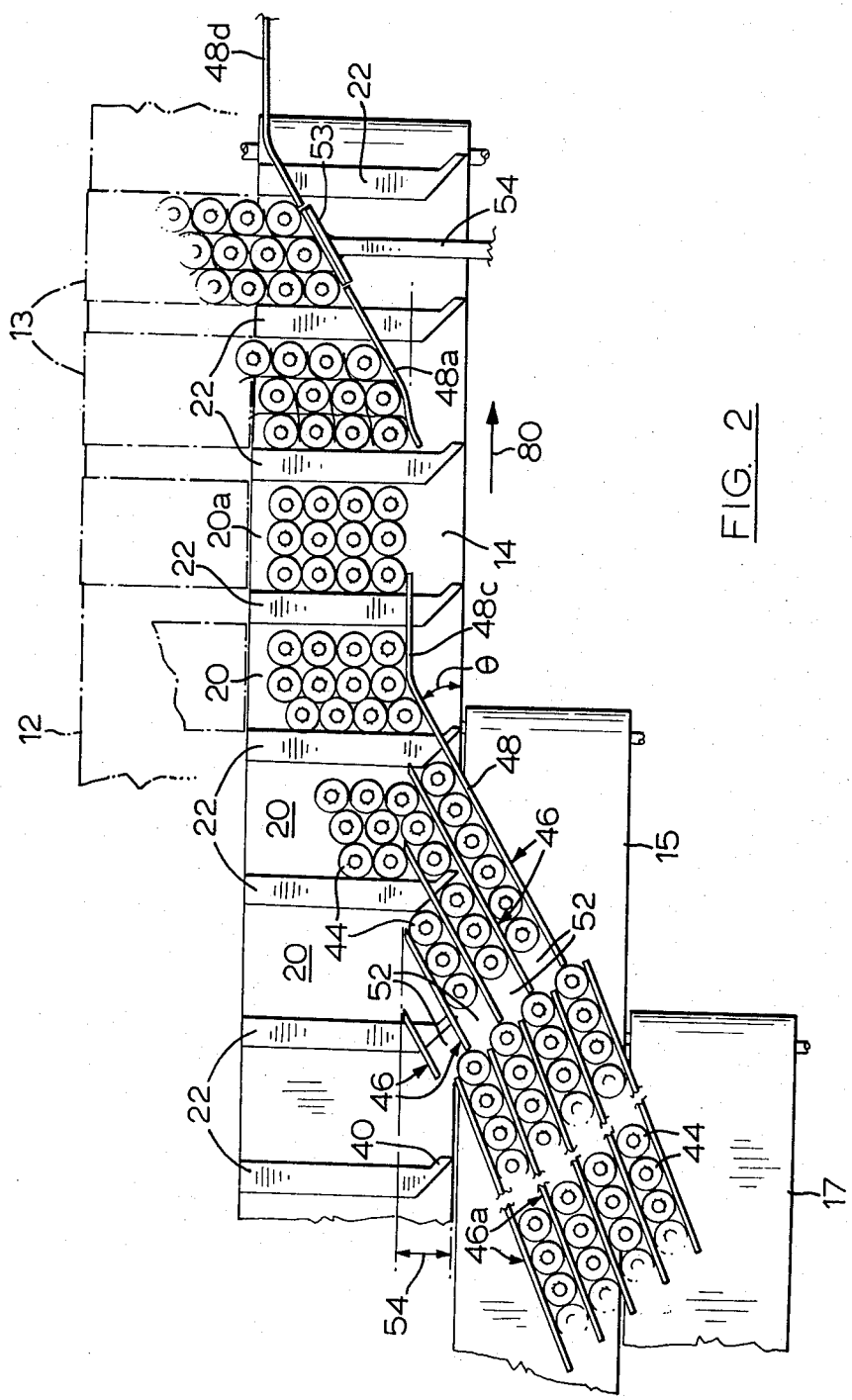

The invention will be more clearly understood after reference to the following detailed specification read in conjunction with the drawings wherein FIG. 1 is a pictorial view of a carton loading station of a carton loading machine; and FIG. 2 is a plan view of the apparatus of FIG. 1.

With reference to the drawings, the reference numeral 10 refers generally to the end loading station of a carton loading machine.

The carton loading machine in which the end loader of the present invention may be used is described in U.S. Pat. No. 3,645,068 dated Feb. 29, 1972. A carton opening mechanism such as that described in my co-pending application Ser. No. 251,765 filed May 9, 1972, may be used to locate cartons on a continuously moving conveyor 12 in open configuration with the open end thereof disposed towards the loading apparatus. There are various other forms of apparatus which may be used for opening end loading cartons or trays and depositing them on a conveyor such as conveyor 12.

The machine of the present invention includes an endless conveyor 14 which is adapted to extend about a pair of sprockets 16 (only one of which is shown) and which consists of a plurality of segments 18 which are hingedly connected to one another so as to permit the conveyor to follow the contour of the sprockets 16. The length of the conveyor is divided into a plurality of transversely extending compartments 20 by means of a plurality of fence members 22. Each of the fence members 22 consists of a lower transversely extending bar and an upper transversely extending bar 26. The upper and lower transversely extending bars 24 and 26 are connected by a post assembly 28 which is located at the discharge end of the compartments 20. The post 28 includes a plate 30 which extends between the ends of the bars 24 and 26 and a reinforcing web 32 which projects inwardly therefrom.

Each of the bars 24 and 26 has a leading edge 34 and a trailing edge 36. Fingers 38 and 40 project outwardly from the leading edges 34 of the bars 24 and 26 respectively at an obtuse angle to the path of travel of the conveyor 14. The leading edges 34a of the fingers 38 and 40 serve to engage containers in the slips as will be described hereinafter. The trailing edges 36 have angularly inclined portions 36a which extend parallel to the leading edges 34a and have a sufficient width to extend across substantially the full width of the slips as will be described hereinafter to form barriers to limit the flow of containers into the compartments 20. A fence support pad 42 is mounted on the conveyor 14 and is secured to the lower bar 24 to support the lower bar 24 in an elevated position above the conveyor. The pad 42 has a width which is substantially less than the width of the fence means so that it may pass through a narrow gap in the transverse guide rail as will be described hereinafter.

The containers 44 are guided onto the conveyor 14 by means of a plurality of sets of guide rails 46, each set of guide rails including an upper guide rail 48 and a lower guide rail 50. The guide rails 48 and 50 are spaced one above the other a sufficient distance apart to engage portions of the bottle which are preferably located above and below the area of the bottle to which the identifying label is applied so as to avoid any damage to the identifying label during the travel of the bottle along the guide rails. In the embodiment illustrated in FIGS. 1 and 2 of the drawings, five sets of guide rails 46 are provided so as to define therebetween four slips 52 for receiving a plurality of containers therein. Each of the slips 52 has an upstream set of guide rails and a downstream set of guide rails with respect to the direction of travel of the conveyor 14. The guide rails 48 and 50 have a sufficient length to extend over a marginal edge portion 54 of the conveyor 14 and each slip 52 is open at its inner end in a plane which extends longitudinally of the conveyor at the inner edge of the marginal edge portion 54. A second conveyor 15 extends in edge to edge parallel relationship with respect to the first conveyor 14 and underlies the slips 52 so as to engage containers located within the slips 52 and to drive them in a direction towards the conveyor 14. The guide rail sets 46 are inclined at an acute angle with respect to the path of travel of the conveyor 14, preferably at an angle of 30° thereto. A third conveyor 17 may also be provided in edge to edge relationship with respect to the conveyor 15 to assist in urging containers longitudinally of the slipways in a direction of the first conveyor 14.

The transfer mechanism for guiding the containers transversely of the conveyor 14 after they have been separated into groups includes an extension 48a and 50a of the last downstream guide rail members which extend across the path of travel of the conveyor. The upper guide rail 48 is located at a height above the upper arm 26 of the fence member 22 so that the upper guide rail member 48 does not form a barrier in the path of travel of the fence member. The lower guide rail member 50a is arranged at a height above the conveyor to permit the lower bar 24 of the fence 22 to pass thereover. The lower guide rail 50a is formed in two sections which are spaced apart a width sufficient to permit the support pad 42 to pass therebetween when moving with said conveyor. A supplementary guide pad 53 of a height sufficient to pass through the gap provided between the bars 24 and 26 of the fence member and a longitudinal extent substantially equal to the length of the gap formed in the lower guide rail bar 50a is mounted in the guiding plane of the guide rails at a level above the lower guide rail 50a and extending over the length of the gap formed in the lower guide rail 50a. A support bar 54 is connected at one end to the guide pad 53 and projects rearwardly therefrom transversely of the conveyor to be mounted on a suitable vertical support pillar 56 which is supported by the frame of the machine (not shown). The support bar 54 has a width which is less than the width of the gap formed between the bars 24 and 26 of the fence members so as to permit the bars 24 and 26 to pass under and over the transverse bar 54. A layer 58 of a low coefficient plastic material is secured to the guide face of the pad 53.

In order to prevent the loading of compartments 20 with the containers when a carton is not located in a position on conveyor 12 to receive a pay-load, there is provided a gate mechanism 70. Each set of guide rails 46 has an upstream complementary set of guide rails 46a. The gate mechanism 70 includes a transverse bar 72 connected to vertical support plates 74 which are in turn connected to each set of guide rails 46a. A suitable drive mechanism (not shown) is provided for moving the gate mechanism 70 to and fro in the direction of the arrow 76 so as to align the guide rail sets 46 and 46a to permit the free passage of containers along the slips or to misalign the guide rail sets 46 and 46a so that one guide rail set 46 blocks each slip of the guide rails 46a as shown in FIGS. 1 and 2 of the drawings.

When the device of the present apparatus is in use, a plurality of containers 44 such as bottles, cans or the like are fed into the slips 52 by means of a conveyor or the like having a separator mechanism for aligning the containers and discharging them into the slips 52. A mechanism for aligning a plurality of containers pressing along a conveyor is illustrated in U.S. Pat. No. 3,645,068 and does not in itself form a part of the present invention. When the containers are in the slips 52, they are advanced to the gate mechanism 70 by means of conveyors 17 and 15. A carton or tray 13 is simultaneously opened in the carton mechanism. A suitable carton opening mechanism is described in my copending patent application Ser. No. 251,765, filed 9, 1972. The carton opening mechanism is designed to deposit an open-ended end loading carton on conveyor 12 in alignment with the discharge ends of the compartments 20 of the convyor 14. As previously described, if, as a result of an unsuccessful operation in the carton opening device, a carton is not located in the required position opposite the discharge end of a compartment, the gate mechanism 70 is operated to misalign the slips so as to prevent containers being located in the slips in a position for discharge into the compartment 20 which does not have a carton. If a carton is present at the discharge end of a compartment which is to be loaded, the slips 52 are aligned and the containers 44 are urged towards the discharge ends of the slips by conveyors 17 and 15. In operation, the conveyor 15 is preferably driven at a speed sufficient to discharge containers onto the marginal area 54 of the conveyor 12 at a longitudinal speed substantially equal to the speed of travel of the conveyor 14 so that the movement of the containers 44 relative to the conveyor 14 is lateral. The width of each of the compartments 20 is sufficient to receive the number of containers which are required to be located transversely thereof in a free-fitting relationship.

In the embodiment illustrated in FIGS. 1 and 2 of the drawings, each of the compartments 20 has a sufficient width to receive three containers extending transversely thereof. The number of longitudinal rows of containers which are to be located in any one compartment is determined by the number of slips provided. In the embodiment illustrated, four slips are provided and, as a result, four generally longitudinally extending rows of containers are located in each compartment 20 in use. The extent to which the slips extend over the edge of the conveyor 14 is related to the angle of inclination of the slips, the diameter of the containers and the number of containers to be discharged into a longitudinal row in a compartment. The width of the marginal edge $x$ is, therefore, derived from the formula $x = zy \sin \theta$; where $z$ is the number of containers transferred from one slipway into one compartment, $y$ is the diameter of the containers and $\theta$ is the acute angle of inclination of the slipway. It has been found that the operation of this apparatus is particularly smooth when the angle $\theta$ equals 30°.

When the conveyor 14 is driven in the direction of the arrow 80, the containers are directed onto the marginal edge portion 54 of the conveyor 14 by conveyor 15 so as to be located in the path of travel of the input end of the fences 22. The fingers 38 and 40 are located at an angle to the path of the slipways so that as the fences 22 move into engagement with containers in the slipways, the fingers 38 and 40 approach the containers in a plane which is inclined to the path of travel of the containers in the slipways so that the fingers pass between adjacent containers without subjecting the containers to a substantially compressive or abrasive force. It will be noted that in use the containers in the slipways are either engaged by a leading edge of the fingers 38 and 40 or they are barred from movement in the slipways 52 by the trailing edge 36a. As shown in FIG. 2 of the drawings, the containers 44 are driven out of the open end of the slipways 52 by the fences 22 as they move longitudinally in the path of travel of the conveyor. It will be noted that the containers in any one slipway which are downstream of the fences 22 are accelerated away from the remaining containers in the slipway. This action is quite different from the separating action in the prior art where the containers in the slipway would have been braked to permit the other containers to move ahead. While the trailing edge of the fences 22 forms an important barrier to prevent containers spilling into the compartments 20, it may be possible to time the movement of the two conveyors so that the trailing edge of the fences does not play an important part in the separating operation. With this type of separating operation, it is possible to arrange the containers in groups on the conveyor 14 without the repeated braking of the feed supply to the conveyor and the resulting collisions of the containers in the feed mechanism.

Frequently it is desirable to locate a series of dividers between the containers of the pay-load and in order to facilitate this location, the last set of guide rails 48 and 50 are formed with an extension 48c, 50c which extends parallel to the path of travel of the conveyor. When the containers pass from the inclined portion of the guide rail onto the longitudinally extending portion of the guide rail, they are moved into a series of longitudinally extending parallel rows of containers as shown in compartment 20a. In this configuration it is much easier to locate the divider panels between the adjacent longitudinal and transverse rows of containers. A method and apparatus for locating dividers between containers is described in my copending application Ser. No. 343,724 filed Mar. 22, 1973.

The containers continue to move with the conveyor 14 and are again disposed in a transverse staggered relationship by being driven into engagement with the angularly inclined portions of the guide rails 48a and 50a and the containers are driven up the incline of the guide rails 48a and 50a so as to be discharged from the conveyor 14 into the open end of a carton. After the containers are located in the carton, the carton is moved by the conveyor 12 along a further longitudinally extending section of guide rail 48d and 50d so that the containers are realigned in parallel longitudinal and transverse rows. The carton is thereafter closed and discharged from the loading machine.

From the foregoing it will be apparent that the method and apparatus of the present invention provides a substantial number of improvements in the art of end loading cartons.

One major improvement which is provided by the apparatus of the present invention is the elimination of many of the moving parts which were previously required in order to effect the operations which are carried out by the apparatus of this invention. In particular, the elimination of the braking fingers previously located in the feeding mechanism for separating the containers into spaced apart rows eliminates the reliance on this piece of apparatus to achieve the required separation. The separation in the present apparatus is positive in view of the fact that separation only occurs when the fences engage the containers and force them through the angularly inclined input end of the compartments.

The use of stationary guide rails to guide the containers transversely of the conveyor also provides a substantial improvement over the elaborate escalator devices previously employed. In addition, the use of a method of arranging the containers in staggered rows during their transverse feeding into the open end of a compartment with the resultant decrease in the width of the pay-load facilitates the loading of the carton without requiring the carton to be oversize in width. The guide rails are also capable of planing the pay-load into the required axially aligned position after the carton has been loaded.

These and other advantages of the invention of the present application will be apparent to those skilled in the art without departing from the scope of this invention.

What I claim as my invention is:

1. In a machine for loading end loading shipper packages such as cartons, trays or the like with containers such as bottles, cans or the like, the improvement of
   a. conveyor means,
   b. transversely extending spaced apart fence means on said conveyor means, having a leading side disposed in the direction of travel of said conveyor means, and a trailing side disposed in a direction opposite to the direction of travel of the conveyor means,
   c. a plurality of container slips converging with said conveyor, each slip being inclined at an acute angle to the longitudinal direction of said conveyor and opening onto said conveyor,
   d. the leading side of each of said fences being adapted to engage a container in each of said slips in turn as the fence is driven by said conveyor across said plurality of slips to move said container along its respective slip,
   e. the trailing side of each of said fences being adapted to restrain movement of containers through said slips until raked therefrom by the leading side of the next following fence,
   f. each of said slips having a guide means engageable by the side of a container that inclines in a direction transverse of said conveyor to move the containers raked by said fence transversely of said conveyor, and
   g. feed means for feeding containers through said slip means.

2. A machine as claimed in claim 1 wherein each of said slips comprises upstream guide rail means and downstream guide rail means extending in a spaced parallel relationship with respect to one another.

3. A machine as claimed in claim 2 wherein said upstream guide rail means and said downstream guide rail means comprises an upper guide rail and a lower guide rail extending in spaced parallel relationship with respect to said first conveyor and with respect to one another to define a fence receiving passage therebetween.

4. A machine as claimed in claim 1 wherein the end of each of said slips has a discharge end disposed in a discharge plane extending parallel to a marginal edge of said first conveyor and spaced longitudinally thereof such that said slips extend over a marginal area of said conveyor.

5. A machine as claimed in claim 1 wherein said slips are inclined at an angle of 30° to said first conveyor means.

6. In a machine for loading end loading shipper packages such as cartons, trays or the like with containers such as bottles, cans or the like, the improvement of conveyor means, transversely extending spaced apart fence means on said conveyor means, having a leading side disposed in the direction of travel of said conveyor means, and a trailing side disposed in a direction opposite to the direction of travel of the conveyor means, a plurality of container slips converging with said conveyor, each slip being inclined at an acute angle to the longitudinal direction of said conveyor and opening onto said conveyor, the leading side of each of said fences being adapted to engage a container in each of said slips in turn as the fence is driven by said conveyor across said plurality of slips to move said container along its respective slip, the trailing side of each of said fences being adapted to restrain movement of containers through said slips until raked therefrom by the leading side of the next following fence, each of said slips having a guide means engageable by the side of a container that inclines in a direction transverse of said conveyor to move the containers raked by said fence transversely of said conveyor, and feed means for feeding containers through said slip means, each of said fence means having an angularly inclined end portion extending inwardly from one edge of said conveyor at an obtuse angle to the path of travel of said fence means to define an angularly inclined input passage of each slip at one edge of said conveyor.

7. A machine as claimed in claim 6 wherein said angularly inclined edge portion of said fence means is disposed at an angle of 135° to the path of travel of said first conveyor means.

8. A machine as claimed in claim 1 wherein said discharge ends of said slips are spaced inwardly from said one edge of said conveyor a distance $x$; wherein $x$ is derived from the formula $x = zy \sin \theta$; where $z$ = the number of containers transferred from one slipway into one compartment;

$y$ = the diameter of the containers, and $\theta$ = the acute angle of inclination of the slipway.

9. A machine as claimed in claim 3 wherein the last downstream guide rail means has an extension having at least one outer portion extending at an acute angle across said first conveyor so as to guide any containers located in said compartments transversely of said compartments to discharge through said output end of said compartments into a waiting shipper package in a plurality of parallel staggered rows having a combined width less than a multiple of the container diameter and the number of container rows.

10. In a machine for loading end loading shipper packages such as cartons, trays or the like with containers such as bottles, cans or the like, the improvement of conveyor means, transversely extending spaced apart fence means on said conveyor means, having a leading side disposed in the direction of travel of said conveyor means, and a trailing side disposed in a direction opposite to the direction of travel of the conveyor means, a plurality of container slips converging with said conveyor, each slip being inclined at an acute angle to the longitudinal direction of said conveyor and opening onto said conveyor, the leading side of each of said fences being adapted to engage a container in each of said slips in turn as the fence is driven by said conveyor across said plurality of slips to move said container along its respective slip, the trailing side of each of said fences being adapted to restrain movement of containers through said slips until raked therefrom by the leading side of the next following fence, each of said slips having a guide means engageable by the side of a container that inclines in a direction transverse of said conveyor to move the containers raked by said fence transversely of said conveyor, and a second conveyor means for urging containers longitudinally of said slips.

11. A machine as claimed in claim 10 in which said second conveyor means comprises a conveyor belt extending in a parallel edge to edge relationship with respect to said first conveyor means and underlying said slips so as to discharge containers onto said first conveyor at a velocity, in the direction of travel of said first conveyor, substantially equal to the velocity of said first conveyor.

12. A machine as claimed in claim 6 wherein said angularly inclined portion of each fence has a width substantially equal to the width of each slip so as to close each slipway in turn at a point spaced inwardly from the discharge end of each slipway as said fence moves longitudinally past said slipways.

13. In a machine for loading end loading shipper packages such as cartons, trays or the like with containers such as bottles, cans or the like, the improvement of
a. continuously moving first conveyor means having a longitudinally extending marginal edge area at one edge thereof,
b. fence means extending transversely of said first conveyor means and dividing said first conveyor means into a plurality of transverse compartments which are open at either end,
c. second conveyor means converging with said first conveyor means at an acute angle,
d. longitudinal guide rail means dividing said second conveyor into a plurality of longitudinally extending slips, each of which extends across the marginal edge portion of said first conveyor,
e. said fence means having an end portion projecting into said marginal edge portion of said first conveyor, said fence means being longitudinally spaced relative to said first conveyor to drive a predetermined number of containers deposited on said marginal edge portion through the discharge end of said slips into said chamber.

14. In a machine for loading end loading shipper packages such as cartons, trays or the like with containers such as bottles, cans or the like, the improvement of
a. conveyor means,
b. spaced apart transversely extending fence means on said conveyor means,
c. each of said transversely extending fences having a lower bar elevated from said conveyor,
d. fence support means mounted on said conveyor and connecting said lower bar of said fence means to said conveyor,
e. container guide means having a first guide rail overlying said conveyor and underlying said lower bar of said fence for a portion of its extent and overlying said lower bar of said fence for a predetermined portion of its extent,
f. said container guide means extending substantially across said conveyor at an incline to the longitudinal axis of said conveyor to guide containers laterally of said conveyor, said first guide rail overlying said lower bar of said fence as aforesaid over the path of said fence support means during movement of said conveyor.

15. A machine as claimed in claim 14 wherein said first container guide means includes a second guide rail overlying said first guide rail.

16. A machine as claimed in claim 15 wherein said transversely extending fences have a height sufficient to pass between said first and second guide rail means when moving along said path of travel of said conveyor.

17. In a machine for loading end loading shipper packages such as cartons, trays or the like with containers such as bottles, cans or the like, the improvement of
a. conveyor means having a longitudinally extending discharge edge,
b. a plurality of spaced apart transversely extending fence means on said conveyor means, each of said fence means having a lower transverse bar elevated from said conveyor and an upper bar extending in a spaced parallel relationship with respect to said lower bar, and
c. vertical post means extending between said upper and lower bars adjacent said discharge edge of said conveyor so as to cooperate with said upper and lower bar to define a U-shaped passage opening inwardly from the edge of the conveyor opposite said discharge edge,
d. fence support means mounted on said conveyor connecting said lower bar of said fence means to said conveyor, said fence support means having a transverse width substantially less that the transverse extent of said upper and lower bars,
e. container guide means having an upper and lower guide rail, said lower guide rail overlying said conveyor and underlying the portions of said lower bar which are not in the path of travel of said fence support means and a second portion overlying the lower bar and underlying th upper bar in the area of the path of travel of said fence support means, said guide rail means extending substantially across said conveyor at an incline to the longitudinal axis of said conveyor.

18. A machine as claimed in claim 17 wherein the portion of the lower guide rail which overlies the lower bar is in the form of a guide pad of a width sufficient to extend a substantial distance between said upper and lower guide rails and including support bar means extending transversely therefrom rearwardly of the plane of said guide means, said transverse support bar means having a width sufficient to pass through said U-shaped passage means of said fence means as said fence means travels longitudinally on said conveyor.

19. In a machine for loading end loading shipper packages such as cartons, trays or the like with containers such as bottles, cans or the like, the improvement of conveyors means, transversely extending spaced apart fence means on said conveyor means, having a leading side disposed in the direction of travel of said conveyor means, and a trailing side disposed in a direction opposite to the direction of travel of the conveyor means, a plurality of container slips converging with said conveyor, each slip being inclined at an acute angle to the longitudinal direction of said conveyor and opening into said conveyor, the leading side of each of said fences being adapted to engage a container in each of said slips in turn as the fence is driven by said conveyor across said plurality of slips to move said container along its respective slip, the trailing side of each of said fences being adapted to restrain movement of containers through said slips until raked therefrom by the leading side of the next following fence, each of said slips having a guide means engageable by the side of a container that inclines in a direction transverse of said conveyor to move the containers raked by said fence transversely of said conveyor, and feed means for feeding containers through said slip means, said fence means comprises a pair of spaced parallel arms and mounting means adjacent the other edge of said first conveyor means for supporting said arms in a transversely extending position spaced above said first conveyor so as to pass between the guide rail means of said slipways when moving through said slipways.

* * * * *